US008111478B2

(12) United States Patent
Shen

(10) Patent No.: US 8,111,478 B2
(45) Date of Patent: Feb. 7, 2012

(54) REDUCING A SPREADING OF CONTAMINANTS WITHIN A HARD DISK DRIVE

(75) Inventor: Jr-Yi Shen, Santa Clara, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 528 days.

(21) Appl. No.: 12/342,427

(22) Filed: Dec. 23, 2008

(65) Prior Publication Data

US 2010/0157468 A1 Jun. 24, 2010

(51) Int. Cl.
*G11B 33/14* (2006.01)

(52) U.S. Cl. ............... 360/97.01; 360/97.02; 360/97.03; 360/97.04

(58) Field of Classification Search .............. 360/97.01, 360/97.02, 97.03, 97.04, 132; 252/194
See application file for complete search history.

(56) References Cited

U.S. PATENT DOCUMENTS

| 4,642,715 | A | * | 2/1987 | Ende | 360/97.02 |
| 4,989,806 | A | * | 2/1991 | Eggebeen | 360/132 |
| 5,291,355 | A | * | 3/1994 | Hatch et al. | 360/97.01 |
| 6,008,966 | A | | 12/1999 | Forbord et al. | |
| 6,011,670 | A | | 1/2000 | Balsley, Jr. et al. | |
| 6,214,255 | B1 | * | 4/2001 | Hekal | 252/194 |
| 6,519,110 | B2 | | 2/2003 | Dague et al. | |
| 6,625,014 | B1 | * | 9/2003 | Tucker et al. | 360/97.01 |
| 6,765,751 | B2 | * | 7/2004 | Huang et al. | 360/97.01 |
| 6,900,962 | B1 | * | 5/2005 | Forbord | 360/97.02 |
| 6,989,958 | B2 | | 1/2006 | De Leo et al. | |
| 7,082,012 | B2 | | 7/2006 | Macpherson et al. | |
| 7,312,950 | B2 | * | 12/2007 | Voights et al. | 360/97.02 |
| 7,359,144 | B2 | * | 4/2008 | Xu et al. | 360/97.02 |
| 7,362,540 | B2 | * | 4/2008 | Repphun et al. | 360/97.02 |
| 2005/0046996 | A1 | | 3/2005 | Kimura et al. | |
| 2006/0114601 | A1 | | 6/2006 | Semba et al. | |

FOREIGN PATENT DOCUMENTS

WO WO 2006/108294 10/2006

OTHER PUBLICATIONS

Hitachi Corp., "Dessicant filled Arm Electronics Bracket", http://www.priorartdatabase.com/IPCOM/000127367/, 1 page.

* cited by examiner

Primary Examiner — Trong Phan

(57) ABSTRACT

Reducing a spreading of contaminants within a hard disk drive is described. An adhesive is applied to a first side of a desiccant. Then, the desiccant is utilized to cover a component of a hard disk drive, the component comprising a countersink area surrounding a fastener, wherein said fastener is countersunk within the component. The adhesive is then coupled with the component to encapsulate contaminants lying within the countersink area, thereby reducing a spreading of the contaminants within the hard disk drive.

20 Claims, 3 Drawing Sheets

REDUCING A SPREADING OF CONTAMINANTS WITHIN A HARD DISK DRIVE

FIELD

Embodiments of the present technology relates generally to the field of computing.

BACKGROUND

At least one hard disk drive (HDD) is used in almost all computer system operations. In fact, most computing systems are not operational without some type of HDD to store the most basic computing information such as the boot operation, the operating system, the applications, and the like. In general, the HDD is a device which may or may not be removable, but without which the computing system will generally not operate.

The basic HDD model includes a storage disk or hard disk that spins at a designed rotational speed. An actuator arm with a suspended slider is utilized to reach out over the disk. The slider is coupled with a suspension that supports both the body of the slider and a head assembly that has a magnetic read/write transducer or head or heads for reading/writing information to or from a location on the disk. The complete head assembly, e.g., the suspension, slider, and head, is called a head gimbal assembly (HGA).

In operation, the hard disk is rotated at a set speed via a spindle motor assembly having a central drive hub. There are tracks at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk as a string of bits.

Contamination, such as, but not limited to dust and metallic particles, located in the hard disk system may adversely affect the performance of the hard disk. For example, contamination located on the read/write head may cause unstable flight of the head. Contamination on the magnetic disk medium may contaminate the head and also cause error in information regarding the read/write on the magnetic disk.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Generally, fasteners, such as, but not limited to screws, may be used to mechanically clamp some components of a hard disk drive together via a countersinking method. Metallic particles are created due to the tooling interaction between the screws and the threaded screw holes. Some of the created metallic particles remain in the countersink area surrounding a screw engaged in a threaded hole. Without some sort of restraint mechanism, these particles can spread throughout the disk enclosure volume and onto the disk surface(s) and potentially critically damage the HDD. Embodiments of the present technology encapsulate the contaminants lying within the countersink area, thereby reducing the spreading of the contaminants throughout the HDD. Additionally, embodiments of the present technology provide a moisture-controlled environment for the covered component of the HDD.

The discussion below will begin with an overview of a hard disk drive and components connected therewith. The discussion will then focus on embodiments of a device and method for reducing a spread of overall contaminants within a hard disk drive.

Hard Disk Drive

Figure 1:
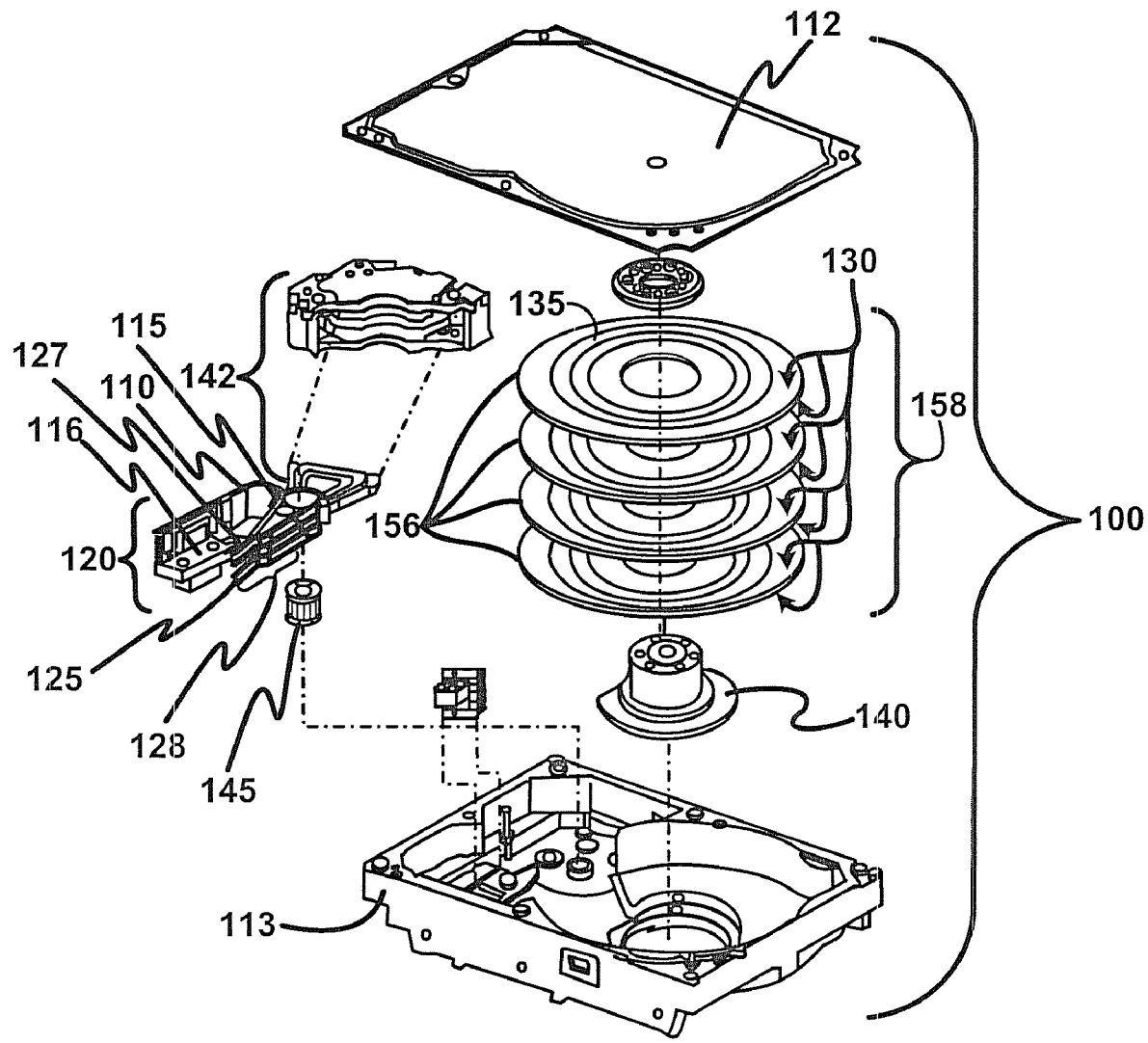
FIG. 1 is an isometric blow-apart of an HDD, in accordance with embodiments of the present technology

With reference to FIG. 1, an isometric blow-apart of HDD 100 is shown in accordance with an embodiment of the present invention. Base casting 113 provides coupling points for components and subassemblies such as disk stack 158, voice coil motor (VCM) 142, and HSA 120. Disk stack 158 is coupled with base casting 113 by means of motor-hub assembly 140. Motor-hub assembly 140 will have at least one disk 156 coupled with it such that disk 156 can rotate about an axis common to motor-hub assembly 140 and the center of disk 156. Disk 156 has at least one disk surface 130 upon which reside data track 135. HSA 120, referred to as an actuator when coupled with pivot bearing 145, comprises suspension 127, which suspends hard disk drive slider 125 next to disk surface 130, and connector 116, which conveys data between A/E module 115 and a host system wherein HDD 100 resides. Suspension 127 and hard disk drive slider 125 comprise head gimbal assembly (HGA) 128. Flex cable 110, which is part of HSA 120, conveys data between connector 116 and HSA 120.

HSA 120 is coupled pivotally with base casting 113 by means of pivot bearing 145, such that VCM 142 can move HGA 128 with slider 125 arcuately across disk surface 130. Upon assembly of HSA 120, disk stack 158, VCM 142, and other components with base casting 113, cover 112 is coupled with base casting 113 to enclose these components and subassemblies into HDD 100.

Figure 2:
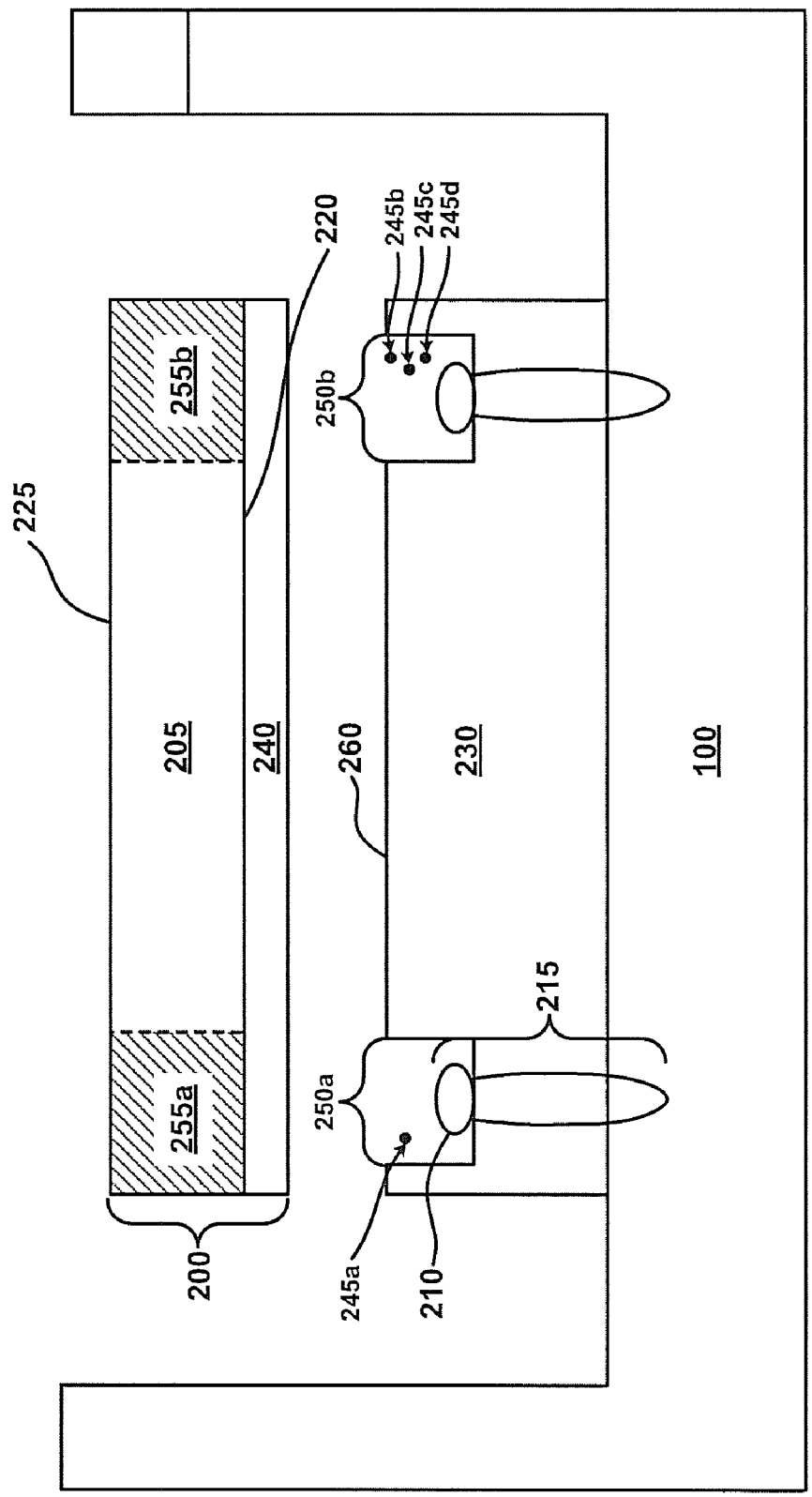
FIG. 2 is a block diagram of an example device for reducing a spreading of encapsulated contaminants within a hard disk drive, in accordance with embodiments of the present technology.

Example Device for Reducing a Spreading of Contaminants within a Hard Disk Drive FIG. 2 is a block diagram of an example device 200 for reducing a spreading of contaminants within HDD 100. Device 200 includes desiccant 205 and adhesive 240. Desiccant 205 includes a first side 220 and a second side 225. In one embodiment, first side 220 is coupled with adhesive 240. It is appreciated that desiccant 225 and adhesive 240 may be any desiccant and adhesive suitable for cooperatively functioning within an HDD environment. In one embodiment, desiccant 205 comprises rigid material. In another embodiment, desiccant 205 comprises flexible material.

In one embodiment, desiccant 225 is configured for covering a component 230 of HDD 100, wherein component 230 includes a countersink area 250a surrounding a portion 210 of a fastener 215, wherein fastener 215 is countersunk within a component 230 of HDD 100. In context, fastener 215 being "countersunk" within component 230 refers to being positioned such that portion 210 of fastener 215 lies flush with or below the surface 260 of component 230. In one example, dessicant 225 comprises portions 255a and 255b configured to cover countersink areas 250a and 250b, respectively.

In one embodiment, fastener 215 couples component 230 with HDD 100. In another embodiment, fastener 215 is a screw. It is appreciated that fastener 215 may be any tool that is suitable for coupling one HDD component with another HDD component and that is suitable for functioning within an HDD environment. In one embodiment, portion 210 is an end portion of fastener 215. For example, portion 210 may be a screw head.

Additionally, in one embodiment, portion 210 of fastener 215 is exposed to an internal section of HDD 100 before being covered by desiccant 205. For example, a screw may couple component 230 and HDD 100 via threading the screw first through a hole in component 230 and then through a corresponding hole in HDD 100. After the screw is threaded first through a hole in component 230 and then through a corresponding hole in HDD 100, the screw head remains exposed to an internal environment of HDD 100 until it is covered by desiccant 205.

In one embodiment, adhesive 240 is configured for coupling with component 230 to encapsulate contaminants 245a-245d lying within countersink area 250a and 250h, thereby reducing a spreading of contaminants within HDD 100. In one embodiment, adhesive 240 is suitable for only a single usage.

Thus, embodiments of the present technology have at least two functions. Embodiments provide a desiccant layer that controls moisture within an HDD component while also reducing the spreading of contaminants lying in a countersink area within the HDD. By reducing the spreading of contaminants, the present technology reduces damage to an HDD caused by these contaminants.

Figure 3:
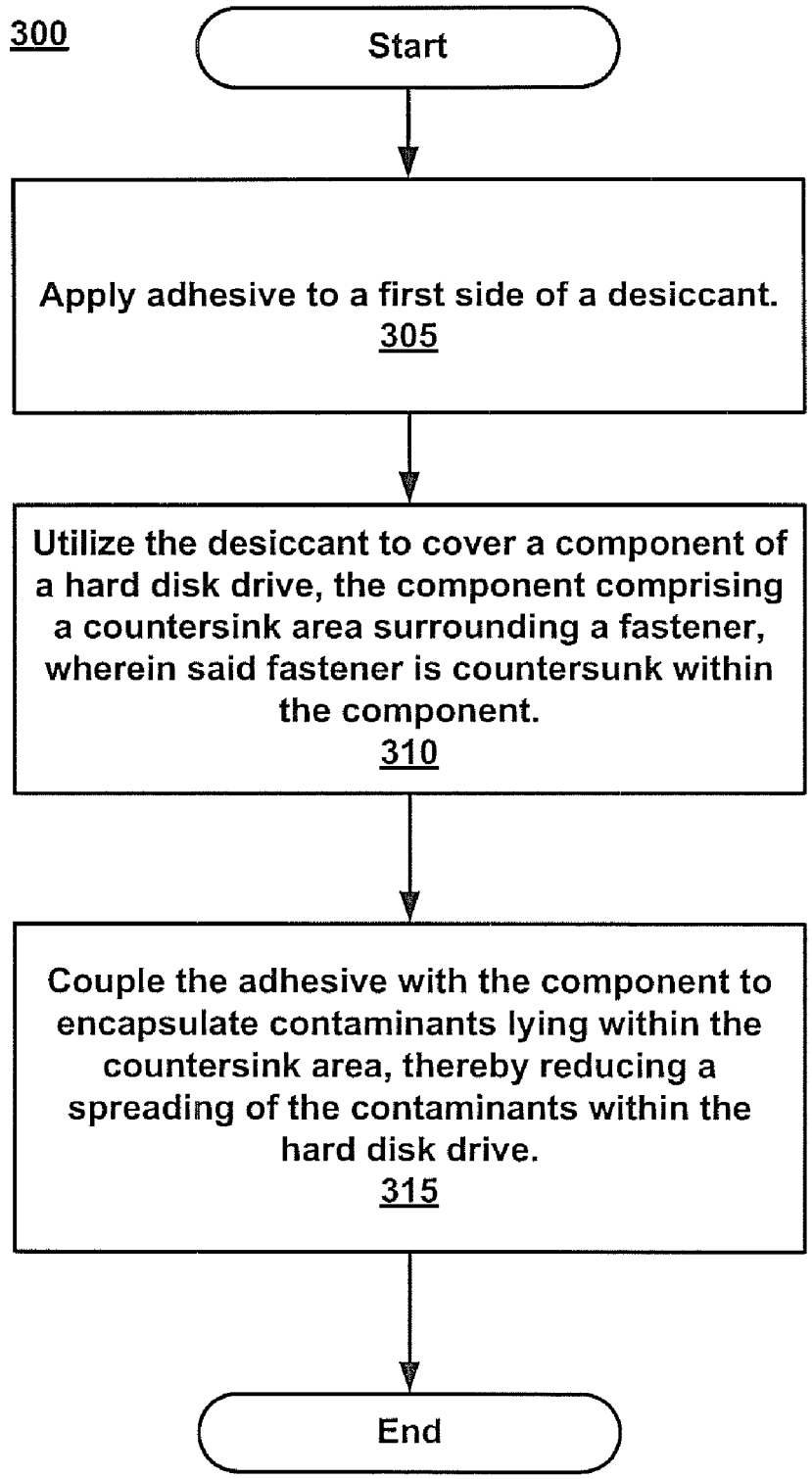
FIG. 3 illustrates an example of a flow chart of a method of manufacturing a device for reducing a spreading of contaminants within a hard disk drive, in accordance with embodiments of the present technology.

Example Method for Reducing a Spreading of Contaminants within a Hard Disk Drive FIG. 3 illustrates the method 300 of manufacturing a device for reducing the spreading of contaminants within an HDD. Referring to 305 of FIG. 3 and as described herein, in one embodiment adhesive 240 is applied to a first side 220 of desiccant 205.

Referring to 310 of FIG. 3 and as described herein, in one embodiment desiccant 205 is utilized to cover countersink areas 250a and 250b within component 230 of HDD 100. Referring to 315 of FIG. 3 and as described herein, in one embodiment adhesive 240 is coupled with component 230 of HDD 100 to encapsulate contaminant 245a lying within countersink area 250a and contaminants 245b-245d lying within countersink area 250b, thereby reducing a spreading of contaminants 245a-245d within HDD 100.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A device comprising:
   a desiccant configured for covering a component of a hard disk drive, said component comprising a countersink area surrounding a portion of a fastener, said fastener being countersunk within said component, and said fastener coupling said component with said hard disk drive; and
   an adhesive coupled with a first side of said desiccant and configured for coupling with said component to encapsulate contaminants lying within said countersink area, thereby reducing a spreading of said contaminants within said hard disk drive.

2. The device of claim 1, wherein said portion of said fastener is exposed to an internal section of said hard disk drive before being covered by said desiccant.

3. The device of claim 1, wherein said adhesive is configured for usage within a hard disk drive environment.

4. The device of claim 3, wherein said adhesive is suitable for a single usage.

5. The device of claim 1, wherein said desiccant comprises a rigid material.

6. The device of claim 1, wherein said desiccant comprises a flexible material.

7. The device of claim 1, wherein said portion of said fastener is one hundred percent of said fastener.

8. The device of claim 7, wherein said fastener is a screw.

9. The device of claim 8, wherein said portion of said fastener is a head of said screw.

10. A method of manufacturing a device for reducing a spread of contaminants within a hard disk drive, said method comprising:
    applying adhesive to a first side of a desiccant;
    utilizing said desiccant to cover a component of said hard disk drive, said component comprising a countersink area surrounding a fastener, wherein said fastener is countersunk within said component; and
    coupling said adhesive with said component to encapsulate contaminants lying within said countersink area, thereby reducing a spreading of said contaminants within said hard disk drive.

11. The method of claim 10, further comprising:
    applying said adhesive that is suitable for an environment within said hard disk drive.

12. The method of claim 10, wherein said adhesive is suitable for a single usage.

13. The method of claim 10, further comprising:
    utilizing said desiccant to cover said fastener, wherein a portion of said fastener is exposed to an internal section of said hard disk drive before being covered by said desiccant.

14. The method of claim 10, further comprising:
    utilizing said desiccant that is rigid.

15. The method of claim 10, further comprising:
    utilizing said desiccant that is flexible.

16. The method of claim 10, further comprising:
    utilizing said desiccant to cover said portion of said fastener, wherein said fastener is a screw.

17. A contamination seal assembly comprising:
    a component of a hard disk drive with a fastener countersunk therein, said fastener configured for coupling said component with said hard disk drive;
    a desiccant configured for covering said component, said component comprising a countersink area surrounding a portion of said fastener; and
    an adhesive coupled with said component and coupled with a first side of said desiccant to encapsulate contaminants located within said countersink area, thereby reducing a spreading of said contaminants within said hard disk drive.

18. The contamination seal assembly of claim 17, wherein said portion of said fastener is exposed to an internal section of said hard disk drive before being covered by said desiccant.

19. The contamination seal assembly of claim 17, wherein said desiccant comprises a rigid material.

20. The contamination seal assembly of claim 17, wherein said desiccant comprises a flexible material.

* * * * *